(12) United States Patent
Monsch et al.

(10) Patent No.: US 10,140,340 B2
(45) Date of Patent: Nov. 27, 2018

(54) STANDARDIZING ATTRIBUTES AND ENTITIES IN A SOCIAL NETWORKING SYSTEM

(71) Applicant: Microsoft Technology Licensing, LLC, Redmond, WA (US)

(72) Inventors: Matthieu F. Monsch, San Francisco, CA (US); Mathieu Bastian, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 370 days.

(21) Appl. No.: 14/595,378

(22) Filed: Jan. 13, 2015

(65) Prior Publication Data

US 2016/0203139 A1    Jul. 14, 2016

(51) Int. Cl.
*G06F 7/00*     (2006.01)
*G06F 17/00*    (2006.01)
*G06F 17/30*    (2006.01)

(52) U.S. Cl.
CPC .... *G06F 17/3053* (2013.01); *G06F 17/30533* (2013.01); *G06F 17/30893* (2013.01)

(58) Field of Classification Search
CPC ......... G06F 17/30395; G06F 17/30386; G06F 17/30525; G06F 17/30867; G06F 17/3002; G06F 17/3053; G06F 17/30707; G06F 17/30905; G06F 17/3087; G06F 17/30398; G06F 17/3064
See application file for complete search history.

(56) References Cited

U.S. PATENT DOCUMENTS

| | | | |
|---|---|---|---|
| 8,650,177 B2 | 2/2014 | Skomoroch et al. | |
| 8,818,832 B2* | 8/2014 | Goyal | G06Q 10/00 705/321 |
| 2006/0206505 A1* | 9/2006 | Hyder | G06Q 10/10 |
| 2008/0005086 A1* | 1/2008 | Moore | G06F 17/30876 |
| 2008/0313000 A1* | 12/2008 | Degeratu | G06Q 10/06 705/319 |
| 2009/0177754 A1* | 7/2009 | Brezina | G06Q 10/107 709/206 |
| 2011/0087552 A1* | 4/2011 | Carver | G06Q 30/02 705/14.72 |
| 2011/0106711 A1* | 5/2011 | Goyal | G06Q 10/00 705/80 |

(Continued)

*Primary Examiner* — Susan Chen
(74) *Attorney, Agent, or Firm* — Schwegman Lundberg & Woessner, P.A.

(57) ABSTRACT

A system extracts data from profiles on a social networking system. The system writes the data to a database when the data exceeds a first threshold. The system then determines a degree of similarity between the data and other similar data, and writes the data and a first portion of the other similar data to the database when the degree of similarity between the data and the first portion of the other similar data exceeds a second threshold. The system then receives into the computer processor input from a plurality of users. The input relates to an agreement or disagreement regarding the degree of similarity between the data and the first portion of the other similar data. The system writes the data and a second portion of the other similar data to the database as a function of the agreement or disagreement of the plurality of users.

15 Claims, 7 Drawing Sheets

(56) References Cited

U.S. PATENT DOCUMENTS

| | | | |
|---|---|---|---|
| 2011/0167115 A1* | 7/2011 | Gilbert | G06Q 10/00 709/204 |
| 2011/0238591 A1* | 9/2011 | Kerr | G06Q 10/06 705/321 |
| 2011/0258200 A1* | 10/2011 | Drummond | G06Q 50/01 707/748 |
| 2012/0089617 A1* | 4/2012 | Frey | G06F 17/30867 707/748 |
| 2013/0268373 A1* | 10/2013 | Grishaver | G06Q 30/02 705/14.67 |
| 2013/0344968 A1* | 12/2013 | Halfteck | A63F 13/00 463/43 |
| 2015/0228004 A1* | 8/2015 | Bednarek | G06Q 30/0633 705/26.8 |
| 2016/0335603 A1* | 11/2016 | Davar | G06Q 10/1053 |

* cited by examiner

| | SEARCH AND SEIZURE | SEARCH | SEIZURE | LAW ENFORCEMENT | GOOGLE | COMPUTER SOFTWARE |
|---|---|---|---|---|---|---|
| SEARCH AND SEIZURE | 1 | 7 | 9 | 15 | 1 | 0 |
| SEARCH | 7 | 1 | 3 | 5 | 8 | 5 |
| SEIZURE | | | 1 | 4 | 0 | 2 |
| LAW ENFORCEMENT | | | | 1 | 1 | 2 |
| GOOGLE | | | | | 1 | 8 |
| COMPUTE SOFTWARE | | | | | | 1 |

STANDARDIZING ATTRIBUTES AND ENTITIES IN A SOCIAL NETWORKING SYSTEM

RELATED APPLICATIONS

This disclosure is related to U.S. application Ser. No. 13/357,171, entitled Skill Extraction System, which issued as U.S. Pat. No. 8,650,177 on Feb. 11, 2014, the contents of which are incorporated herein by reference in their entirety for all purposes.

TECHNICAL FIELD

The subject matter disclosed herein generally relates to a computer system, and in an embodiment, a computer system configured to standardize attributes and entities in a social networking system.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright LinkedIn, Co., 2014, All Rights Reserved.

BACKGROUND

A social networking service is a computer or web-based application that enables users to establish links or connections with persons for the purpose of sharing information with one another. Some social networks aim to enable friends and family to communicate with one another, while others are specifically directed to business users with a goal of enabling the sharing of business information. A social and/or business networking system maintains data about hundreds of thousands, and more likely than not, millions of people. These data can include a profile of each member of the social networking system. These profiles can include personal attributes such as information relating to a person's educational history, employment history, skills set, and other pertinent information about the person.

SUMMARY

In an embodiment, a system, method, and/or computer program medium receives into a computer processor data extracted from profiles on a social networking system. The data is written to a database when the data exceeds a first threshold. A degree of similarity between the data and other similar data is determined, and the data and a first portion of the other similar data are written to the database when the degree of similarity between the data and the first portion of the other similar data exceeds a second threshold. Input is then received from a plurality of users. The input indicates an agreement or disagreement regarding the degree of similarity between the data and the first portion of the other similar data. After receiving the input from the users, the data and a second portion of the other similar data are written to the database as a function of the agreement or disagreement of the plurality of users.

In another embodiment, data are extracted from profiles on a social networking system. The extracted data relate to a personal attribute. The data are written to a database when the number of occurrences of a first personal attribute exceeds a first threshold. After the first threshold is exceeded, a plurality of pairings is generated. Each of the plurality of pairings includes the first personal attribute and one of a plurality of other similar personal attributes. A degree of similarity between the first personal attribute and the other similar personal attribute in each of the plurality of pairings is determined. One or more of the pairings are written to the database when the degree of similarity between the first personal attribute and the other similar personal attribute exceeds a second threshold. Thereafter, input is received from a plurality of users. The input indicates an agreement or disagreement regarding the degree of similarity of the one or more of the pairings. A portion of the one or more pairings is written to the database as a function of the agreement or disagreement of the plurality of users.

These examples can be combined in any permutation or combination. This summary is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

Some embodiments are illustrated by way of example and not limitation in the figures of the accompanying drawings.

DETAILED DESCRIPTION

Figure 1:
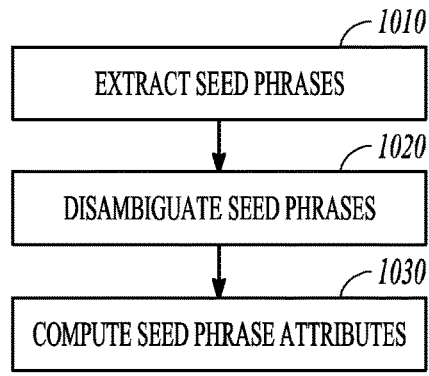
FIG. 1 illustrates an example method of extracting skills from a social networking system.

In the following, a detailed description of examples will be given with references to the drawings. It should be understood that various modifications to the examples may be made. In particular, elements of one example may be combined and used in other examples to form new examples.

Many of the examples described herein are provided in the context of a social or business networking website or service. However, the applicability of the inventive subject matter is not limited to a social or business networking service. A social networking service is an online service, platform or site that allows members to build or reflect social networks or social relations among members. Typically, members construct profiles, which may include personal information such as name, contact information, employment information, photographs, personal messages, status information, links to web-related content, blogs, and so on.

Typically, only a portion of a members profile may be viewed by the general public, and/or other members.

The social networking site allows members to identify, and establish links or connections, with other members in order to build or reflect social networks or social relations among members. For instance, in the context of a business networking service (a type of social networking service), a person may establish a link or connection with his or her business contacts, including work colleagues, clients, customers, and so on. With a social networking service, a person may establish links or connections with his or her friends and family. A connection is generally formed using an invitation process in which one member "invites" a second member to form a link. The second member then has the option of accepting or declining the invitation.

In general, a connection or link represents, or is otherwise associated with, an information access privilege, such that a first person who has established a connection with a second person is, via the establishment of that connection, authorizing the second person to view or access non-publicly available portions of their profiles. Of course, depending on the particular implementation of the business/social networking service, the nature and type of the information that may be shared, as well as the granularity with which the access privileges may be defined to protect certain types of data, may vary greatly.

In the context of business social networks, users often may submit a list of skills that they possess as part of their member profiles. Other users, advertisers, and businesses may then use these skill lists to ascertain what a particular member is good at or interested in. An inherent problem with using member-submitted skills is that different users may describe the same basic skill in a somewhat different manner. That is, there is no standard as to how a particular skill should be identified or classified. One or more embodiments of this disclosure address that problem by classifying (or creating taxonomies for) the ways users refer to and identify skills. While the disclosure may use as an example the classification of personal skills, the technique disclosed herein can be used to classify any entity or attribute. Before addressing techniques to standardize personal skills or attributes, general extraction and disambiguation processes such skills in a social networking system are discussed.

Turning now to FIG. 1, one example method of obtaining available skills from profiles in a social networking system is shown. In step 1010, seed phrases may be extracted from text contained in member profiles of members of the business or social networking service. Seed phrases in one example are one or more words that represent a possible skill. The seed phrases may be individual words such as "Java" or phrases of words such as "java.net," or "search and seizure." In one example, the seed phrases may be extracted from a skills section of the member profiles, but in other examples, seed phrases may be extracted from other sections of a member's profile. In one example, the skills section of a member's profile is a free text (e.g., unstructured) section that allows members to type in any skills they feel they possess. In some examples, all member profiles of a social networking service are used to gather seed phrases, but in other examples, only a subset of all member profiles may be used. For example, the system may only extract seed phrases from profiles of members in a particular industry, in a particular geographic region, or who work for a particular company.

Along with gathering the skill seed phrases, context information, or "meta data," may be gathered. One such item of meta data may include co-occurrent phrases. Co-occurrent phrases are words or phrases that occur in the same member profile as the seed words or phrases and are used in a later processing operation as one way of ascertaining an intended meaning of a seed phrase. A given phrase may be a co-occurrent phrase for a particular skill seed phrase, and may be a skill seed phrase itself. Additionally, this meta data may include other information in the member profile of the members in which the seed phrase exists, including a member's reported industry, institution, employer, projects, geographic location, group membership, and the like.

Figure 2:
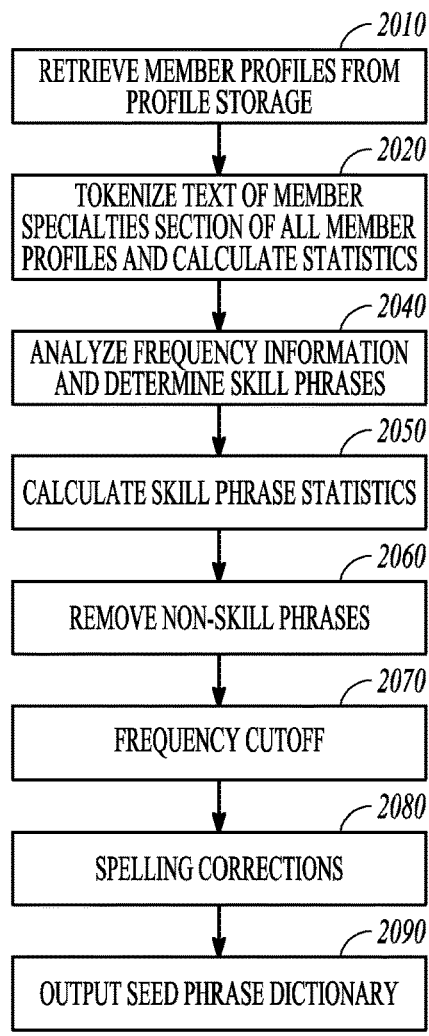
FIG. 2 illustrates an example method of seed phrase extraction.

FIG. 2 presents one example of the operations performed to extract seed phrases from member profiles. In step 2010 member profiles from a social networking or business networking site are retrieved from an electronic storage area. The electronic storage area may include computer memory, both non-volatile and volatile, a computer database, another computer system, or the like. In some examples, all member profiles are retrieved, but in other examples only certain member profiles may be included in the skill seed phrase extraction. These selected member profiles may be selected based on a variety of factors. Some factors may include a predetermined list of members, members listing an association with a particular school, organization, work environment, workplace, geographic location, skills listed, or member popularity.

In step 2020, the specialties section is retrieved from the member profiles. For instance, with some embodiments, the specialties section is that portion of a member's profile that stores the member's self-described or selected skills, or specialties. Each specialties section may then be tokenized based upon commonly used delimiters such as a comma, slash, carriage return, conjunctive or disjunctive words ("and," "or"), and the like. Tokenization is the process of breaking a stream of text up into words, phrases, symbols, or other meaningful elements called tokens. Thus for example, a member's specialties section of a profile might contain the text "construction industry, housing and development, foundations/support." The system may initially tokenize this into "construction industry," "housing", "development," "foundations," "support." Once the text is tokenized, the system calculates the number of times a particular token is found in the specialties section of the member profiles of the system. The member specialties section is used herein for illustrative purposes, and as already stated, other sections may be used to establish the skill seed phrases.

In some examples, certain aspects of the present disclosure, including tokenization may be done in parallel using a batch processing system over a distributed computer system. In some examples, this distributed computer system may be managed by Apache Hadoop, which is a software framework that supports data intensive distributed applications developed by the Apache Software Foundation, Inc. In some examples, certain aspects of the present disclosure, including tokenization, may be implemented by the MapReduce software method which is a framework for processing huge datasets on distributable problems using a large number of computers (or nodes) which are referred to as a cluster. MapReduce is described in U.S. Pat. No. 7,650,331 issued to Dean, et. al. and assigned to Google Inc., of Mountain View, Calif., which is hereby incorporated by reference in its entirety. In MapReduce, there are two phases: the map phase and the reduce phase. In the "map" phase, "chunks" of data are assigned to different servers which then process the data according to a defined algorithm and return a result. The servers may break up the data into even smaller chunks and assign each smaller chunk to a map process running on the server, where many map functions may execute on a single server. The results from all the map processes are then aggregated according to a predefined process in the "reduce" phase.

In the case of the tokenization in step 2020, the data may be chunked for the map phase into any portion or subportion of the input data used to create a list of skills. In some examples, the chunks may include a plurality of profiles, a single profile, sections of profiles, or even sections of text from a portion of a profile, for example, the specialties or skills section. The map processes may then tokenize the given data chunk by parsing the given data chunk and splitting it into words or phrases based upon the delimiters used. Each map process then returns each token to the reduce process. The reduce process may then count the number of times a particular token has been passed back by all the various map processes, establishing a token frequency. In some examples, this map-reduce frequency calculation may be done multiple times. The first passes may use a minimal set of delimiters whereas additional passes may add additional delimiters. This may result in establishing frequency statistics for both longer phrases ("search and seizure") as well as constituent individual words ("search," and "seizure"), which in some examples may be used in later stages.

While distributed computing methods using MapReduce are described, it will be appreciated by a person who is skilled in the art with the benefit of the present disclosure that other methods are possible. For example, a single computer system may do all the processing described as opposed to a distributed computing system. Also, instead of MapReduce, other solutions may be used, including but not limited to, the use of "if-then" and "for loop" programming techniques to iterate over all the member profiles and skills section text in order to tokenize and count token frequency, and perform other method steps of the present disclosure. In addition, other distributed computing solutions may be utilized apart from Hadoop. Alternative distributed computing approaches may be employed such as Message Passing Interface ("MPI") or a cluster of workers with a single master node to partition out parsing tasks.

In step 2040, the frequency of token occurrence information may be used to determine whether two different tokens correspond to a specific skill phrase and therefore should not be separated by the tokenization. For example, the phrase "search and seizure," might be broken up in step 2020 into "search" and "seizure," however the skill phrase "search and seizure," would be best kept together as it likely refers to one skill. Some skill phrases such as "C++ and Java" should be broken apart into "C++," and "Java," as those are considered separate skills. In some examples, whether or not to split the seed phrases may be determined by calculating whether any of the component tokens occurred individually less often than the compound phrases. If not, then the component tokens will be kept separate, otherwise they will be combined. Thus for example, frequency information for "search," "seizure," and "search and seizure" may be calculated. If "search" appeared 5 times and "seizure" appeared 3 times, but "search and seizure" occurred 10 times, then the skill seed phrase may be the compound phrase "search and seizure."

In step 2050, this first pass data may be fed back into the system to scan member profiles again to determine a count of how many times each phrase occurs in the member profiles. In some examples, this may be done using MapReduce and Hadoop as in step 2020. In this case however, instead of splitting at the selected delimiters automatically, the system may use the analysis performed in step 2040 to come up with a refined splitting algorithm. Thus, for example, instead of splitting "search and seizure," the system may treat it as a single phrase in producing a frequency count if the analysis in step 2040 indicates it should be treated as such. In some examples, this may be an iterative process and the data may be fed back into scan member profiles again, each time with a refined splitting algorithm until the list of skills converges.

In step 2060, certain non-skill seed phrases may be removed from further consideration. Thus phrases clearly not relating to skills may be removed. For example, phrases corresponding to certain categories of language not likely to be skill-related may be removed. In some examples, articles, prepositions, verbs, nouns, or any combination may be removed. In some examples, phrases that may be inappropriate, offensive or too graphic may be removed. Various methods may be used to achieve this, including submission of the phrases to crowd-sourcing jobs, dictionaries, or blacklists. A "blacklist" is a list that contains common non-skill phrases. If a skill phrase is on the blacklist, it may be removed from further processing. In some examples, this operation may be done prior to tokenization after the member profile section is read from storage.

In step 2070, in some examples, statistically insignificant seed phrases may be removed from further consideration. Thus if the frequency of occurrence of a skill seed phrase is below a threshold, that particular skill seed phrase may be removed from further consideration. Thus, for example, if only one profile out of thousands contains the skill seed phrase, that seed phrase may not be particularly interesting. This allows the size of the skill seed phrase list to be reduced. The threshold may be a predetermined value that indicates a minimum number of times the phrase must occur (e.g., 10 times) to be included, or a predetermined percentage (e.g., it must be included in 0.5% of the scanned member profiles), or some other dynamic algorithm. Further processing of seed phrases that pass this first threshold is described herein.

In 2080, in some examples, a spelling checker and correction algorithm may be used to find and correct spelling deficiencies in the skill seed phrase list. This is to shrink the size of the skill seed phrase list and make the task of standardization easier in later stages by eliminating improperly spelled variants. This may be desirable for skill seed phrases in which misspellings are common.

In step 2090, the resulting list of skill seed phrases not removed from consideration is written to a database. This database may be referred to as the "Seed Phrase Dictionary."

In examples in which the set of standardized skills is determined based upon a free-text area of a member's profile, the various collected seed phrases may be ambiguous. That is, phrases may have more than one meaning, or "senses," and subsequently refer to different skills. For example, the text "search," in a user's skill section of a profile, may refer to a law enforcement context, or it may refer to an internet search context, or it may be a talent search context.

Returning now to FIG. 1, because of this problem, in some examples, the next step in obtaining a list of skills may be phrase disambiguation carried out in step 1020. In phrase disambiguation, the list of skill seed phrases may be expanded to capture the different "senses" of the phrases. "Senses" are different meanings of a given phrase. So, for example, if the list of skill seed phrases initially is "search," and information is found in the member profiles to suggest several different senses of "search," then the list of skill seed phrases may be expanded to include all or some of the particular senses. Additionally, the skill seed phrases may be annotated to identify the sense. Thus the list of skill seed phrases might expand from one phrase to three (i.e., "search" becomes "search" in the computer science sense, "search," in the law enforcement sense, and "search" in the recruiting sense).

Figures 3, 4:
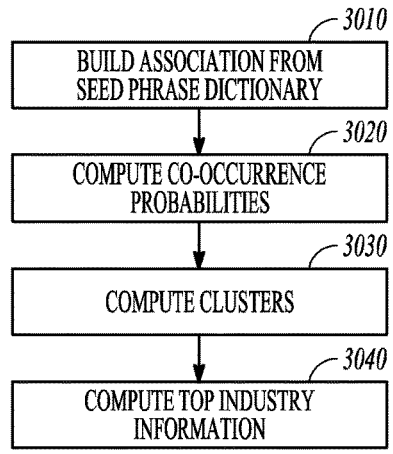
FIG. 3 illustrates an example method of seed phrase disambiguation.
FIG. 4 illustrates an example association matrix.

FIG. 3 shows one example implementation of a disambiguation algorithm. In step 3010, an association matrix may be built by reprocessing the skills section of the member profiles again. The MapReduce functionality may be programmed to emit a count of a co-occurrence of each pair of terms in the seed phrase dictionary for every member profile. A co-occurrence is an instance where two seed phrases occurred in the same member profile. Thus if there are ten terms in the seed phrase dictionary, the association matrix may be a ten-by-ten matrix, each row and column intersection in the matrix corresponding to a count of the number of times the pair of dictionary seed phrases occurred in the scanned member profiles. FIG. 4 depicts a basic example of an association matrix that shows the co-occurrence of six dictionary seed phrases. Thus, for example, the term "Search and Seizure" occurred in the same profile as the term "Law Enforcement" 15 times, whereas it never co-occurred with the term "Computer Software."

In step 3020, a probability analysis may be run using the association matrix to determine, based on a given skill seed phrase, what the likely co-occurrent phrases are. This may be expressed as a probability that given a skill seed phrase, a different phrase will be in co-occurrence. Thus, in FIG. 4, the probability that "Search and Seizure" was present in the same profile as "Law Enforcement" will likely be very high. In some examples, this algorithm may include various similarity metrics like Jaccard Similarity or Term Frequency Inverse Document Frequency (TFIDF).

In step 3030, the probabilities may be used to "cluster" the various related seed phrases into senses using the calculated probabilities. The seed phrases may be clustered based upon the probability that certain co-occurrent terms of the skill seed phrases will occur with other co-occurrent terms. Thus for example, if "search" has a high probability of being co-occurrent with the skill seed phrases "law enforcement," "fbi", "computer programming," and "Java," the system may use the co-occurrent information between those likely co-occurrent phrases to determine "clusters" of "search." Thus for example, if "law enforcement" had a high probability of being co-occurrent with "fbi" and "fbi" had a high probability of being co-occurrent with "law enforcement," but NOT "computer programming," and NOT "Java," then one cluster may be "search, law enforcement, fbi." If Java and computer programming are likely co-occurrent phrases between themselves, then another cluster could be "search, Java, computer programming."

To perform this clustering, an expectation maximum algorithm may be used. For example, an algorithm such as K-means may be used. Co-occurrent phrases may be compared with each other pairwise in the space of all frequently co-occurring or similar phrases for the seed-phrase. Rows of this distance matrix may then be clustered, and clusters may be merged or split as needed until a converged set of disambiguated phrase senses emerge.

In step 3040, the top industry information for each cluster may be computed. This may be done by processing the member profiles using Hadoop and MapReduce again. In this case, the member profiles may be searched for the various dictionary skill seed phrases. Upon finding a dictionary skill seed phrase, the system may read the industry association stored in the member profile. The industry association in some examples is a member-selected industry association. In some examples, the member may select from a predetermined list of industries. In other examples, the industry association may be a free form text association. The clusters may then be analyzed to determine the top industries associated with the skill seed phrases in that cluster. This information may then be stored and used in later stages.

The output of the disambiguation may result in a list of disambiguated skill seed phrase clusters annotated with industry information.

Referring back to FIG. 1, in step 1030, additional attributes may be calculated by running the member profiles back through the profile processing. Such attributes may include calculating the top industry, related phrases, and other statistical information about the skill seed phrases. This extra step may be done in some embodiments, rather than collecting this information along with other processing steps above because the skill phrases may be constantly changing. Thus because of the de-duplication above, the statistics kept (i.e. top industry, etc.) may need to be updated to reflect this de-duplication.

The present disclosure builds on a system that extracts skills and other attributes from a social networking system or service, and in particular, describes a method, system, and product for generating and/or identifying a set of standardized skills from member profiles of a social or business networking service. The list of standardized skills, along with information in a member profile section of the social networking service may be used to identify members of the social networking service that possess one of those identified skills. In an embodiment, members identified as possessing a given skill may be ranked relative to one another with respect to the given skill based upon various implicit, explicit, internal and external factors. The skills and rankings may be used to deliver content and customization to those members and others.

An embodiment automatically imports new unstandardized entities into a system, such as a social networking system. It uses a machine-learning model to find similarities between unstandardized entities, and suggests mappings based on these similarities. This enables a high quality, human curated, taxonomy. Taxonomy refers to a classification of these entities, and information relating to similarity and equality of entities. As explained in detail herein, it supports a collaborative approach to taxonomy changes via a robust system of votes. It collects and displays data on the popularity of both unstandardized and standardized entities, thereby allowing for trend discovery. It is scalable and extensible. For example, it permits entities in multiple languages.

More specifically, an embodiment includes three different parts—a process that extracts unstandardized entities from members' profiles, a process that computes entity similarities, and an interface through which the taxonomy can be edited by users and/or operators of the social networking service.

In an embodiment, the first component runs on a regular schedule (e.g., daily) on a distributed computing framework. It tracks member profiles in a social networking system to extract unstandardized entities, and imports them into a centralized database once they reach a given popularity or threshold. This threshold can be dynamic and locale-specific. Furthermore, this process supports custom normalization of any imported text (e.g., for character disambiguation).

A goal of the second component is to de-duplicate entities so entities that have a similar meaning are grouped together. It is scheduled separately from the first component but can be executed as often as the first component. It collects various statistics about each entity (e.g., distribution over industries, and co-occurrences across profiles), and then uses these features to score pairs of entities. The top pairs are finally imported and used as suggestions for mapping unstandardized entities. In effect, this reduces the problem of curating the taxonomy from an impractical quadratic complexity (comparing each entity to each other entity) to a very reasonable linear complexity (choosing from the top 20 suggestions). For example, if there are 1,000 words or phrases that have been extracted from personal profiles, it would be inefficient to take a first word or phrase and compare it against the other 999 words and phrases, then check the second word or phrase against all other 999 words and phrases, etc. However, an embodiment offers a new more efficient approach, wherein for each word or phrase of the 1,000 words or phrases, there are 20 top matches. That is, the twenty words from a multi-faceted algorithm that determines the top 20 matches. Moreover, if there is no match in the top 20 words or phrases, no other words or phrases are checked because the algorithm would have identified those other words or phrases if they were similar.

The third component can be a web application that interacts with the taxonomy database. A purpose of the third component is to allow the labeling of unstandardized entities. In an embodiment, this is done via a two-step voting system, which allows multiple users to collaboratively edit the taxonomy. In particular, it preserves history (enabling check-pointing and rollbacks). It also exposes an application program interface (API) for convenient programmatic access and export of data. Finally, the user interface also displays the popularity trends of both unstandardized and standardized entities. The latter are updated in real-time as the taxonomy changes. The third component basically results in a mapping and labeling of the standardized entities. There are many mappings between two words or phrases. Then, out of all the similar mappings, one label is chosen to represent the cluster of similar mappings. The machine learning algorithms generate the mappings, but human curation through the editing capability determines the ultimate mapping and labeling.

Figure 5A:
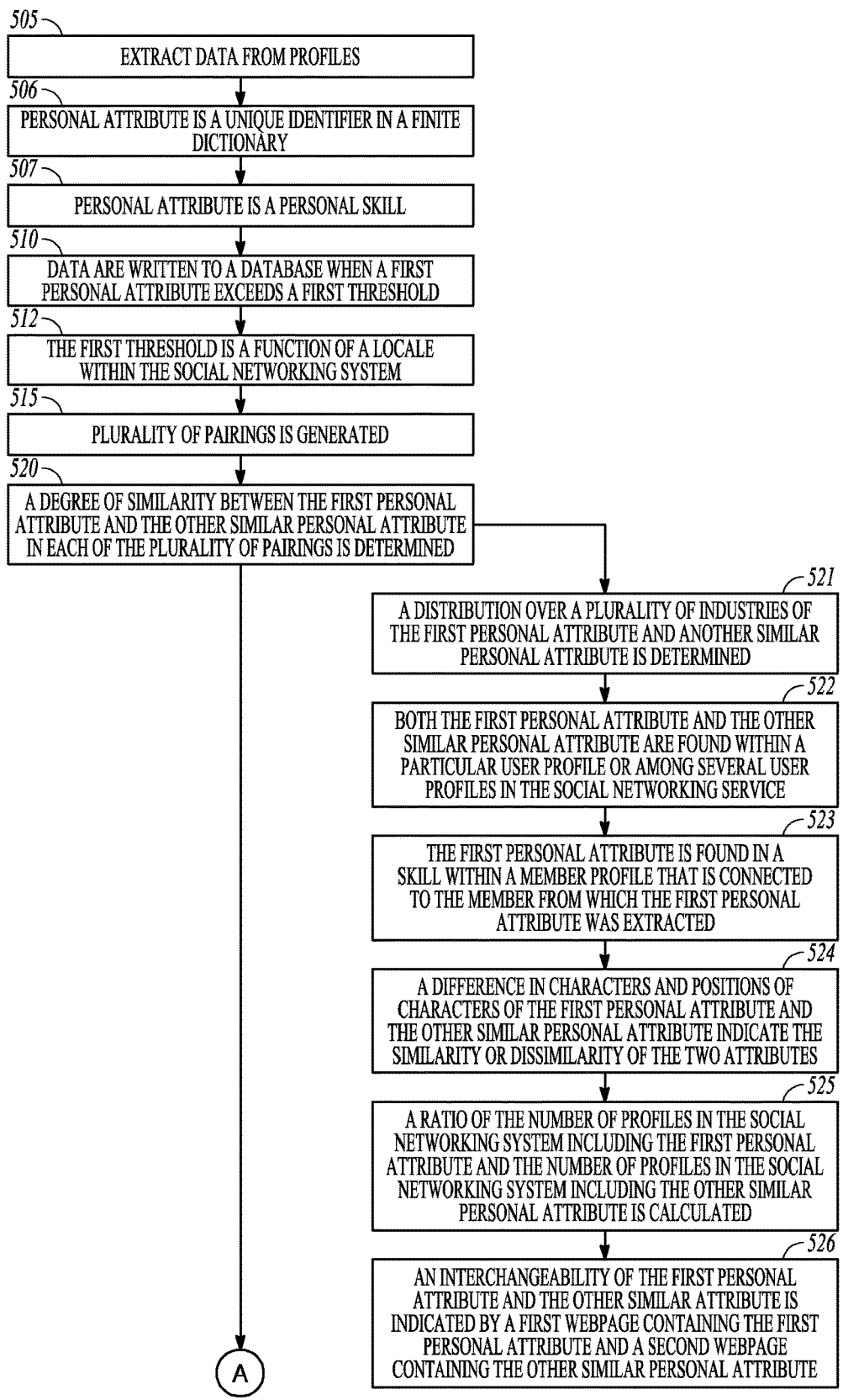
FIGS. 5A, 5B, and 5C illustrate operations and features of an example attribute standardization process and system.
Figure 5B:
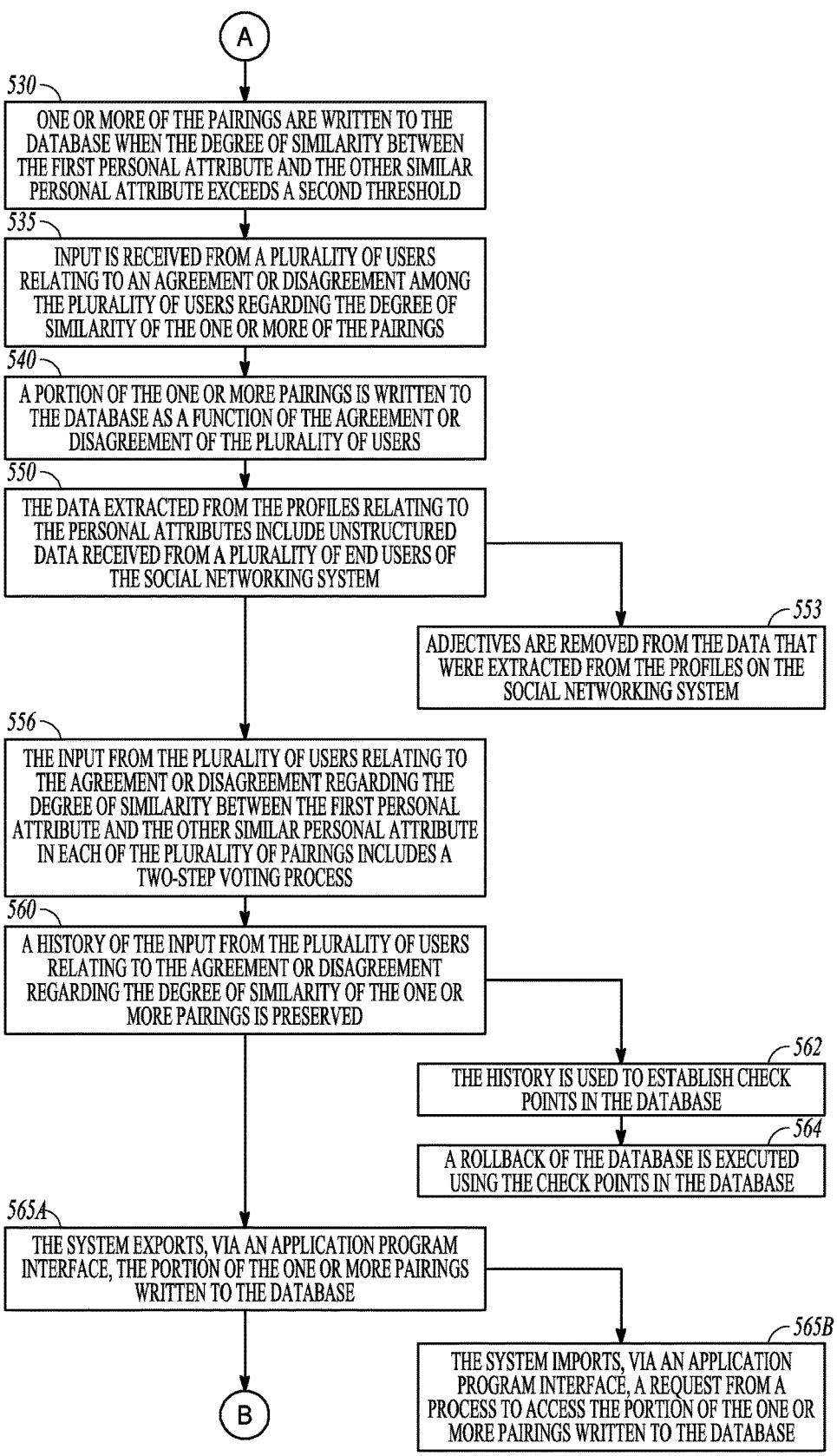
Figure 5C:
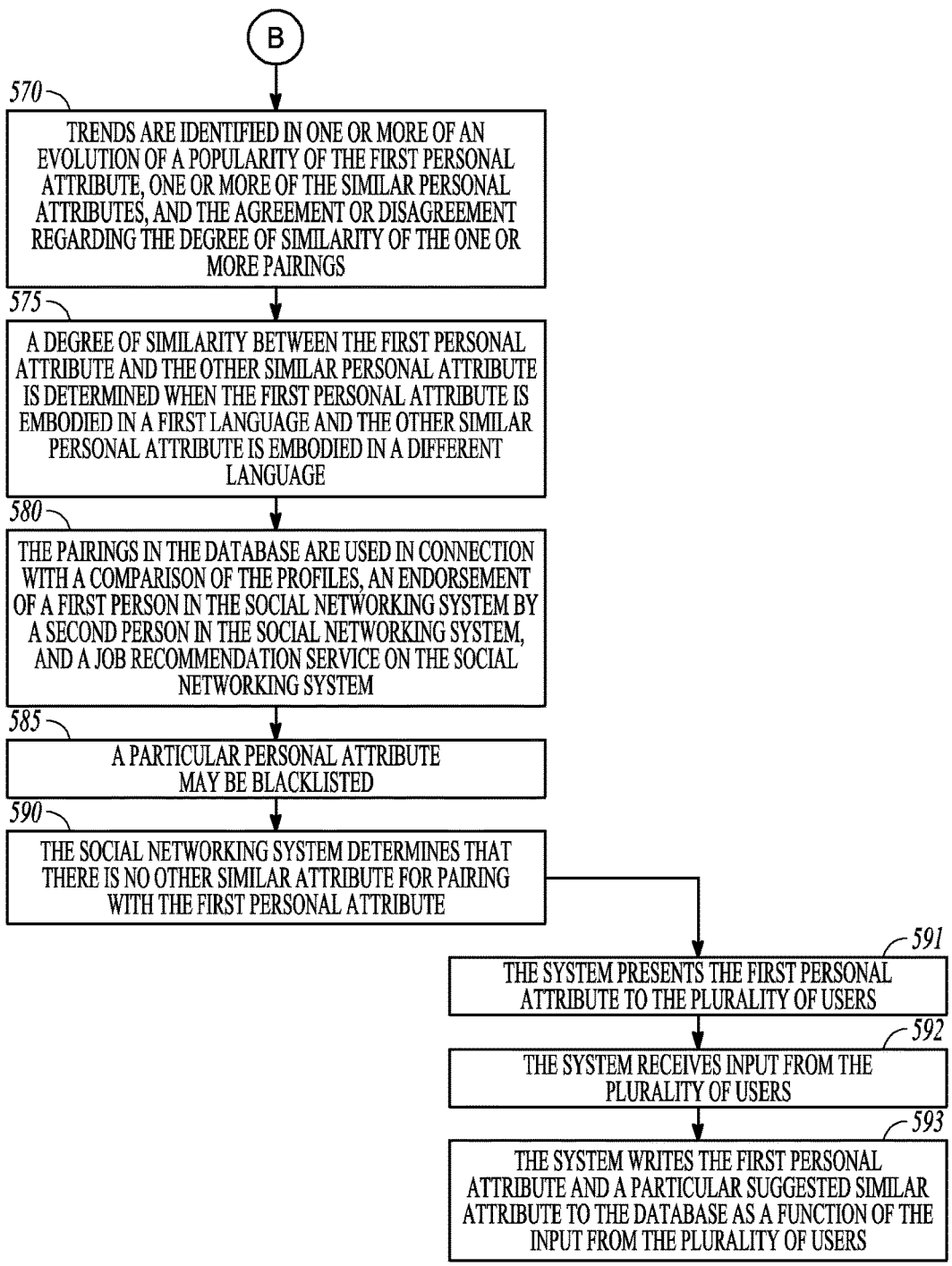

FIGS. 5A, 5B, and 5C are a block diagram illustrating operations and features of a process and system for standardizing attributes and entities in a social networking system. FIGS. 5A, 5B, and 5C include a number of process blocks 505-593. Though arranged substantially serially in the examples of FIGS. 5A, 5B, and 5C, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring to FIGS. 5A, 5B, and 5C, at 505, data are extracted from profiles, and in an embodiment user profiles, on a computerized social networking system. In an embodiment, the data are aggregated counts of data from the user profiles. A social networking system can include a purely social networking system, a business networking system, or a hybrid of a social and business networking system. The data can relate to a personal attribute. As indicated at 506, the personal attribute can include a unique identifier that is part of a finite dictionary. For example, the unique identifier can be a university that a person has attended, and the dictionary can include hundreds of universities attended by and noted in the profiles of persons who are members of the social networking system. As further indicated at 507, the personal attribute can include a personal skill, such as a job description or job skill currently held/possessed or previously held/possessed by the member.

At 510, the data extracted from the social networking system at operation X05 are written to a database when a first personal attribute exceeds a first threshold. For example, if an attribute such as 'UX', which is known in the art as an abbreviation for 'User Experience', is located in and extracted from a plurality of profiles, when the number of occurrences of UX across the plurality of profiles exceeds a particular threshold, e.g., 100 occurrences, a record is written to the database that indicates that UX is a recurring attribute in the profiles of users in the social networking system. As indicated at 512, the first threshold can be a function of a locale within the social networking system. For example, a first locale might relate to persons experienced in Java, while a second locale may relate to persons experience in a second programming language such as $C^{++}$. For one reason or another, the social networking service may want to have different thresholds for these two different types of experience.

At 515, a plurality of pairings is generated. These pairings consist of the first personal attribute (that was written to the database when the first threshold was exceeded) and another similar personal attribute for each of the pairings. For example, the following could be paired with UX—user experience, UX design, user experience design, UXD, and UI.

At 520, a degree of similarity between the first personal attribute and the other similar personal attribute in each of the plurality of pairings is determined. There are several mechanisms that can be used to determine these similarities. For example, as indicated at 521, a distribution over a plurality of industries of the first personal attribute and another similar personal attribute can be determined. This determination can be made using the Internet or other computer network and/or database. In general, if searching over the Internet, other computer networks, and/or other computer databases indicates that the first personal attribute and the other similar personal attribute are often used in a same or related source, then this indicates that the first personal attribute and the other similar personal attribute may be interchangeable. For example, if 'UX' and 'User Experience' appear in many computer developer trade publications, then this is an indication that 'UX' and 'User Experience' have the same meaning and are interchangeable. This determination is enabled somewhat by the configuration of a social network such that each member profile is associated with one particular industry.

A second method for determining the similarity between the first personal attribute and the other similar attribute is illustrated at 522, wherein the system determines that both the first personal attribute and the other similar personal attribute are found within a particular user profile or among several user profiles in the social networking service. As noted above, this can be referred to as a co-occurrence of the first personal attribute and the other similar attribute. Therefore, in a manner similar to the determination of the presence of the first personal attribute and the other similar attribute across an industry, a co-occurrence analysis can determine that 'UX' and 'User Experience' are interchangeable. It is noted that the machine learning algorithm consists of several different algorithms, and finding the co-occurrence of two words or phrases does not mean that they will be considered equivalent or interchangeable. For example, 'UX' and 'java' may co-occur in many member profiles, but through other portions of the machine learning algorithm and/or the editing function will not be identified as being equivalent or interchangeable.

A third method for determining the similarity between the first personal attribute and the other similar attribute is illustrated at 523, wherein it can be determined that the first personal attribute is found in a skill within a member profile that is connected to the member from which the first personal attribute was extracted. For example, if 'UX' was extracted from the skill data of a first member, and that first member is connected to a second member that has 'User Experience' within his or her skill data, then that is an indication that 'UX' and 'User Experience' have the same meaning.

A fourth method for determining the similarity between the first personal attribute and the other similar attribute is illustrated at 524, wherein a difference in characters and positions of characters of the first personal attribute and the other similar personal attribute indicate the similarity or dissimilarity of the two attributes. For example, since there is only a single additional character in 'UXD', this indicates that 'UX' and 'UXD' may be interchangeable.

A fifth method for determining the similarity between the first personal attribute and the other similar attribute is illustrated at 525, where a ratio of the number of profiles in the social networking system including the first personal attribute and the number of profiles in the social networking system including the other similar personal attribute is calculated. If such a ratio is close to unity (i.e., 1), then this unity indicates that the first personal attribute is interchangeable with the other personal attribute. More particularly, these ratios can be used in the machine learning and mapping aspects of the attribute standardization system.

A sixth method for determining the similarity between the first personal attribute and the other similar attribute is illustrated at 526, wherein an interchangeability of the first personal attribute and the other similar attribute is indicated by a first webpage containing the first personal attribute and a second webpage (which is linked to the first webpage) containing the other similar personal attribute. For example, the appearance of the first personal attribute in a first Wikipedia page, and the appearance of the other similar attribute in a linked Wikipedia page, is some evidence for a machine learning algorithm that the first personal attribute and the other similar attribute may have the same meaning and/or be interchangeable.

At 530, one or more of the pairings are written to the database when the degree of similarity between the first personal attribute and the other similar personal attribute exceeds a second threshold. For example, using one or more of the mechanisms outlined in operations 521-526 and/or one or more other mechanisms, scores can be awarded to a pairing depending upon the outcomes of those mechanisms. Whenever the cumulative score of a particular pairing exceeds the threshold, that pairing can be written to the database. For example, if 10 points are awarded for each mechanism that results in a positive outcome (for example, the first personal attribute and the other similar attribute co-occur in a user profile), and a threshold is 40 points, then a cumulative score of 50 points would result in the pairing being written to the database. When a pairing is written to the database at this point, it means that the first personal attribute has the potential of being added to a taxonomy of attributes in the social networking system. For example, if the mechanisms applied to the pairing UX-User Experience results in a cumulative score of 60 points, then UX is made part of the taxonomy in the social networking system (by writing it to the database), and it has the potential of being made part of a permanent taxonomy of the database.

At 535, input is received from a plurality of users. The input relates to an agreement or disagreement among the plurality of users regarding the degree of similarity of the one or more of the pairings. For example, while the machine learning operations of 521-526 and 530 may have determined that 'UX' means 'User Experience', this could be an incorrect determination, and human curation via the input of the plurality of users has approval power or veto power over whether or not such pairing become part of the taxonomy.

At 540, a portion of the one or more pairings is written to the database as a function of the agreement or disagreement of the plurality of users. For example, the agreement/disagreement of the plurality of users may result in the pairs UX-User Experience, UX-UX design, and UX-User Experience Design being written to the database (and becoming part of the system's taxonomy), and the pairings UX-UXD and UX-UI being voted down by the plurality of users and not being written to the database (and hence not becoming part of the social networking system's taxonomy). In an embodiment, the portions of the pairings written to the database occur in near-time.

As noted above, this entire process can be referred to as mapping and labeling. Mappings are connections between phrases, or in an example, personal attributes. If a mapping exists between two phrases (as determined by one of more of operations 521-526), they will belong to the same cluster and be standardized to the same entity. In an embodiment, at most one outgoing mapping can be active at any time from a given phrase. The mapping with the highest score will be chosen.

A voting process is used to add mappings (that is, the input received from users regarding their agreement or disagreement with the similarity of two phrases). More specifically, there are two ways to add new mappings. The first manner is to present the user with a list of suggested mappings (as determined by the machine learning using co-occurrences, industry analysis, and word distance), and receive the user's vote on the whether the mapping is accurate or not (an agreement or disagreement on the similarity of the two phrases). The second manner is to permit the user to manually enter a word or phrase that the user feels best describes or matches the word or phrase at issue.

After the mapping process, the labeling occurs. Labels are connections between phrase clusters and entities. An active label from a cluster to an entity means that all the phrases in that cluster are standardized to that entity. There can only be one active label per cluster at a time, although a cluster's label can change over time (via the operations of machine learning and voting).

Returning to FIGS. 5A. 5B, and 5C, at block 550, it is indicated that the data extracted from the profiles relating to the personal attributes include unstructured data received from a plurality of end users of the social networking system. The system can therefore handle any data entered by users of the social networking system, and if enough of the users include a particular attribute designation in their profiles, such designation can become part of the taxonomy of the social user network.

At operation 553, one or more adjectives are removed from the data that were extracted from the profiles on the social networking system. In an embodiment, this removal is executed prior to determining the degree of similarity between the first personal attribute and the other similar personal attribute in each of the plurality of pairings. This feature removes laudatory and other self-appraising adjectives, which do not assist in determining the similarity between attributes and whether or not to add a particular attribute to the system taxonomy. In an embodiment, a word or phrase can be determined by determining that the presence of the word or phrase in a dictionary database of such words or phrases, or via a determination that such words or phrases do not currently occur in a attribute database.

As previously noted and as indicated at 556, the input from the plurality of users relating to the agreement or disagreement regarding the degree of similarity between the first personal attribute and the other similar personal attribute in each of the plurality of pairings includes a two-step voting process. Specifically, the two step voting process first includes a vote on each of the one or more pairings, and secondly a selection of one of the one or more pairings as a label for the first personal attribute. It is by this labeling that a particular personal attribute becomes a member in the taxonomy of the social networking system.

At operation 560, a history of the input from the plurality of users relating to the agreement or disagreement regarding the degree of similarity of the one or more pairings is preserved. This history can be a simple recording in a database of the votes of the users on the similarity or dissimilarity of the attributes. At 562, the history is used to establish check points in the database. For example, a check point can be established after each 50 votes on the similarity or dissimilarity of the attributes. At 564, a rollback of the database is executed using the check points in the database. Consequently, if a problem is identified at a particular point in time with the determination by users of the similarity or dissimilarity of the attributes, the state of the system can be reestablished prior to that time, and the system re-booted.

At 565A, the system exports, via an application program interface, the portion of the one or more pairings written to the database. This feature permits a social networking service to export its data mining and standardization features to a third party system. In a similar fashion, at 565B, the system imports, via an application program interface, a request from a process to access the portion of the one or more pairings written to the database. This feature permits the social networking system to receive a request from a third party for such mined data and standardized information.

At operation 570, trends are identified in one or more of an evolution of a popularity of the first personal attribute, one or more of the similar personal attributes, and the agreement or disagreement regarding the degree of similarity of the one or more pairings. Such trending of course can be very useful information, and can be used to determine the increasing or decreasing popularity or usage of any particular attribute.

At operation 575, a degree of similarity between the first personal attribute and the other similar personal attribute is determined when the first personal attribute is embodied in a first language and the other similar personal attribute is embodied in a different language. For example, the first attribute may have been extracted from a user who resides in San Jose, Calif., and most probably is in English. However, that user may be connected on a social networking service to a person who resides in France, and his or her profile may include 'Experience Utilisateur'. That is, the system, via machine learning, can determine that 'User Experience' and 'Experience Utilisateur' are interchangeable when for example the first user is connected to several French persons that have 'Experience Utilisateur' in their profiles, and there are several occurrences of 'Experience Utilisateur' across the web design industry in French user profiles.

At operation 580, the pairings in the database are used in connection with a comparison of the profiles, an endorsement of a first person in the social networking system by a second person in the social networking system, and a job recommendation service on the social networking system. For example, if a person has 'UX' in his or her profile, and a company is looking for people with 'User Experience' talents, then the social networking service, knowing that the more informal 'UX' listed in one or more user profiles is the same as the more formal 'User Experience' listed in a company's job description.

At indicated at 585, a particular personal attribute may be blacklisted. This means that this particular attribute is not processed to be standardized in any manner, but is basically just ignored for standardizing purposes. For example, a person's profile in a social networking system may legitimately include information relating to a particularly nationality, ethnicity, or religion. The social networking service however may not want to consider such information in its standardization process.

At 590, the social networking system determines that there is no other similar attribute for pairing with the first personal attribute. At 591, the system presents the first personal attribute to the plurality of users. At 592, the system receives input from the plurality of users. The input includes one or more suggested similar attributes for association with the first personal attribute. At 593, the system writes the first personal attribute and a particular suggested similar attribute to the database as a function of the input from the plurality of users. Operations 590-593 function as a human backup to catch any personal attributes that should be standardized but which were missed by the machine learning algorithm.

Example Social Networking Service

Figure 6:
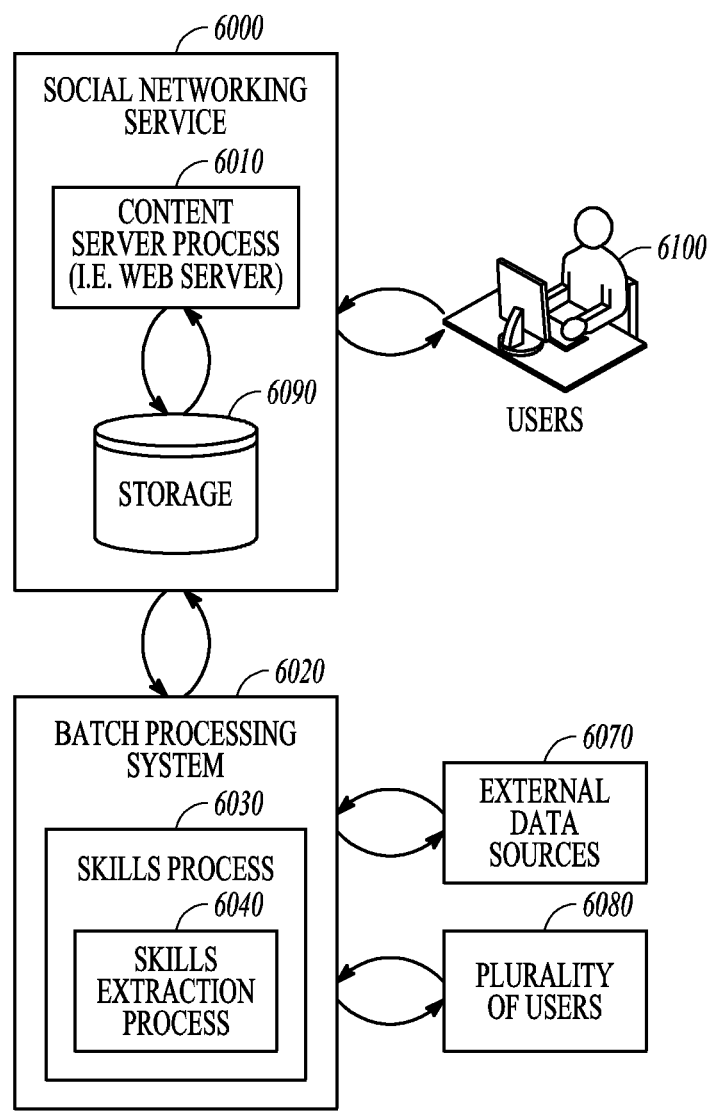
FIG. 6 illustrates an example social networking system.

FIG. 6 shows an example social networking service 6000 according to one example of the current disclosure. Social networking service 6000 may contain a content server process 6010. Content server process 6010 may communicate with storage 6090 and users 6100 through a network. Content server process 6010 may be responsible for the retrieval, presentation, and maintenance of member profiles stored in storage 6090. Content server process 6010 in one example may include or be a web server that fetches or creates internet web pages, which may include portions of, or all of, a member profile at the request of users 6100.

Users 6100 may be an individual, group, or other member, prospective member, or other user of the social networking service 6000. Users 6100 access social networking service 6000 using a computer system through a network. The network may be any means of enabling the social networking service 6000 to communicate data with a computer remotely, such as the internet, an extranet, a LAN, WAN, wireless, wired, or the like, or any combination.

Skills process 6030 may be responsible for creating a list of skills. Skills process 6030 in one example may contain a skills extraction process 6040 to create a list of skills based upon member profiles.

Batch processing system 6020 may be a computing entity which is capable of data processing operations either serially or in parallel. In some examples, batch processing system 6020 may be a single computer. In other examples, batch processing system 6020 may be a series of computers setup to process data in parallel. In some examples, batch processing system 6020 may be part of social networking service 6000.

Skills process 6030 may communicate with the social networking service 6000 to get information used by the skills process 6030 such as member profiles or information from member profiles, and to customize the social networking service 6000 based upon the skills and their rankings.

Skills process 6030 may also communicate with an application 6080 used by a plurality of users to agree or disagree on the similarity between a first personal attribute and other similar personal attributes. Skills process 6030 may also communication with various external data sources 6070 across a network. The network may be any method of enabling communication between social networking service 6000 and the application 6080 used by the plurality of users and/or external data sources 6070. Examples may include, but are not limited to, the internet, an extranet, a LAN, WAN, or wireless network. Skills process 6030 submits personal attribute pairs through the network to the application 6080 for the plurality of users to vote on the personal attribute pairs. The application 6080 may return the results back over the network. Skills process 6030 may also utilize a network to access various remote data systems. The various described networks may be the same or different networks.

Skills extraction process 6040 may extract skills from the various member profiles as well as calculating various statistics and meta data about those skills.

Modules, Components, and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program may be written in any form of programming language, including compiled or interpreted languages, and it may be deployed in any form, including as a stand-alone program or as a module, subroutine, or other unit suitable for use in a computing environment. A computer program may be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations may also be performed by, and apparatus of example embodiments may be implemented as, special purpose logic circuitry, e.g., a field programmable gate array (FPGA) or an application-specific integrated circuit (ASIC).

The computing system may include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Computer Architecture

Figure 7:
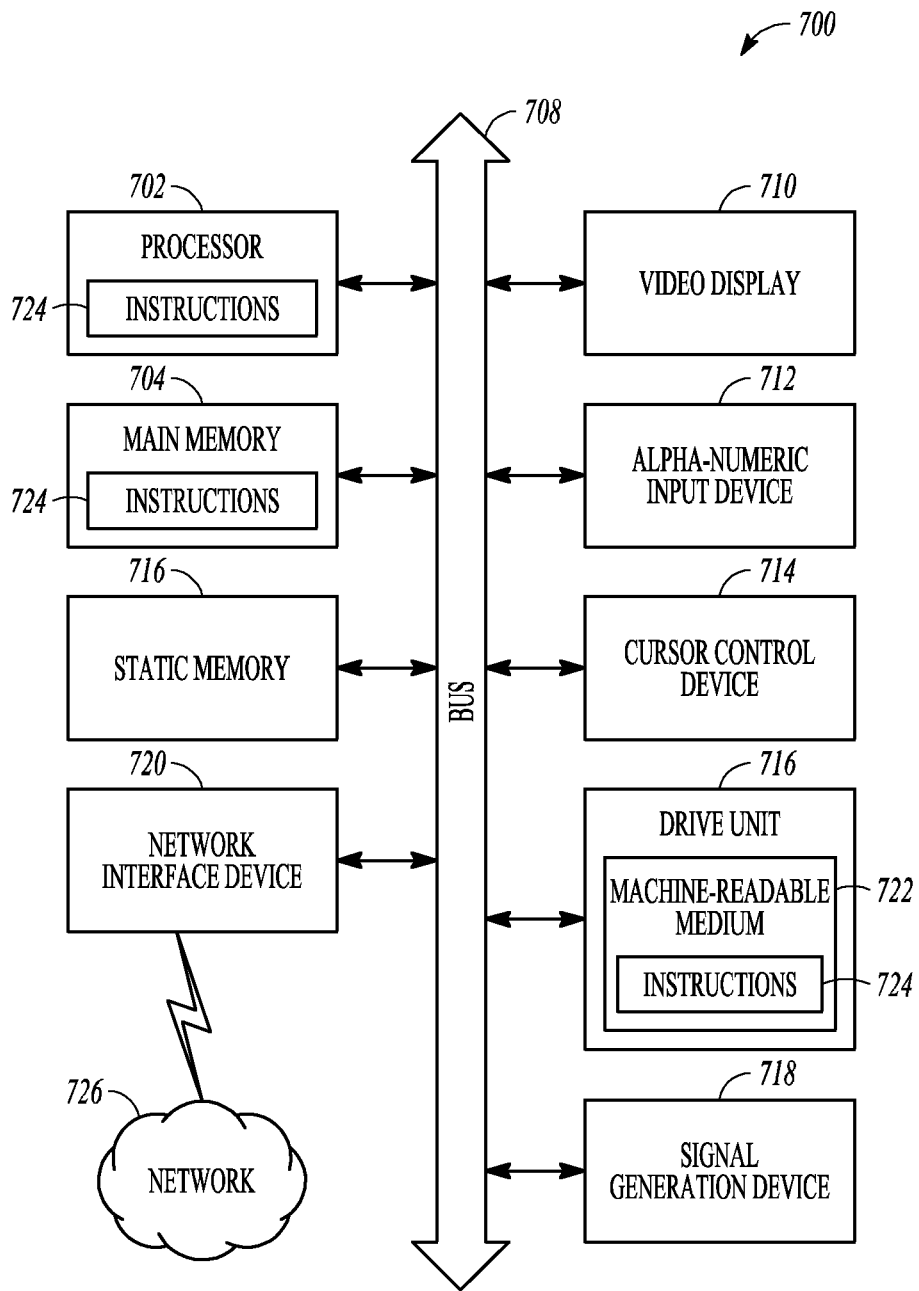
FIG. 7 is a block diagram illustrating components of a machine that is able to read instructions from a machine-readable medium (e.g., a machine-readable storage medium) and perform any one or more of the methodologies discussed herein.

FIG. 7 is a block diagram illustrating components of a machine 700, according to some example embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system and within which instructions 724 (e.g., software) for causing the machine 700 to perform any one or more of the methodologies discussed herein may be executed. In alternative examples, the machine 700 operates as a standalone device or may be connected (e.g., networked) to other machines. In a networked deployment, the machine 700 may operate in the capacity of a server machine or a client machine in a server-client network environment, or as a peer machine in a peer-to-peer (or distributed) network environment. The machine 700 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 724, sequentially or otherwise, that specify actions to be taken by that machine. Further, while only a single machine is illustrated, the term "machine" shall also be taken to include a collection of machines that individually or jointly execute the instructions 724 to perform any one or more of the methodologies discussed herein.

The machine 700 includes a processor 702 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 704, and a static memory 706, which are configured to communicate with each other via a bus 708. The machine 700 may further include a graphics display 710 (e.g., a plasma display panel (PDP), a light emitting diode (LED) display, a liquid crystal display (LCD), a projector, or a cathode ray tube (CRT)). The machine 700 may also include an alphanumeric input device 712 (e.g., a keyboard), a cursor control device 714 (e.g., a mouse, a touchpad, a trackball, a joystick, a motion sensor, or other pointing instrument), a storage unit 716, a signal generation device 718 (e.g., a speaker), and a network interface device 720.

The storage unit 716 includes a machine-readable medium 722 on which is stored the instructions 724 (e.g., software) embodying any one or more of the methodologies or functions described herein. The instructions 724 may also reside, completely or at least partially, within the main memory 704, within the processor 702 (e.g., within the processor's cache memory), or both, during execution thereof by the machine 700. Accordingly, the main memory 704 and the processor 702 may be considered as machine-readable media. The instructions 724 may be transmitted or received over a network 726 via the network interface device 720.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 722 is shown in an example to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., software) for execution by a machine (e.g., machine 700), such that the instructions, when executed by one or more processors of the machine (e.g., processor 702), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Additional Notes

The above detailed description includes references to the accompanying drawings, which form a part of the detailed description. The drawings show, by way of illustration, specific embodiments in which the invention may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments may be combined with each other in various combinations or permutations. The scope of the invention should be determined with reference to the appended claims, along with the full scope of equivalents to which such claims are entitled.

The invention claimed is:

1. A process comprising:
   receiving into a computer processor data extracted from profiles on a social networking system, the data relating to a personal attribute;
   writing the data to a database when a first personal attribute exceeds a first threshold;
   generating a plurality of pairings, each of the plurality of pairings comprising the first personal attribute and one of a plurality of other similar personal attributes;
   for at least one pairing of the plurality of pairings:
      determining a degree of similarity between the first personal attribute and the other similar personal attribute in the at least one pairing;
      in response to the degree of similarity between the first personal attribute and the other similar personal attribute exceeding a second threshold, providing a plurality of users an opportunity to provide input regarding the degree of similarity of the at least one pairing;
      receiving into the computer processor input from the plurality of users, the input indicating an agreement or disagreement by each of the users regarding the degree of similarity of the at least one pairing; and
      writing the at least one pairing to the database based on the input from the plurality of users;
   wherein the determination of the degree of similarity between the first personal attribute and the other similar personal attribute is based on all of the following:
      a distribution over a plurality of industries of the first personal attribute and the other similar personal attribute;
      a co-occurrence within a profile in the social networking service of the first personal attribute and the other similar personal attribute;
      a skill within a profile of a connection within the social networking system;
      a difference in characters and positions of characters of the first personal attribute and the other similar personal attribute;
      a ratio of a number of profiles including the first personal attribute and a number of profiles including the other similar personal attribute; and
      a first webpage containing the first personal attribute and a second webpage containing the other similar personal attribute, wherein the first webpage is linked to the second webpage.

2. The process of claim 1, wherein the personal attribute comprises a unique identifier that is part of a finite dictionary.

3. The process of claim 1, wherein the personal attribute comprises a personal skill.

4. The process of claim 1, wherein the data extracted from the profiles relating to the personal attributes comprise unstructured data received from a plurality of end users of the social networking system.

5. The process of claim 1, comprising removing one or more adjectives from the data extracted from the profiles on the social networking system prior to determining a degree of similarity between the first personal attribute and the other similar personal attribute in each of the plurality of pairings.

6. The process of claim 1, comprising:
   preserving a history of the input from the plurality of users relating to the agreement or disagreement regarding the degree of similarity of the one or more pairings;
   using the history to establish check points in the database; and
   executing a rollback of the database using the check points in the database.

7. The process of claim 1, comprising exporting, via an application program interface, the portion of the one or more pairings written to the database.

8. The process of claim 1, comprising importing, via an application program interface, a request from a process to access the portion of the one or more pairings written to the database.

9. The process of claim 1, comprising identifying trends in one or more of an evolution of a popularity of the first personal attribute, a popularity of one or more of the similar personal attributes, and the agreement or disagreement regarding the degree of similarity of the one or more pairings.

10. The process of claim 1, comprising determining a degree of similarity between the first personal attribute and the other similar personal attribute when the first personal attribute comprises a first language and the other similar personal attribute comprises a second language.

11. The process of claim 1, comprising using the pairings in the database in connection with a comparison of the profiles, an endorsement of a first person in the social networking system by a second person in the social networking system, and a job recommendation service on the social networking system.

12. The process of claim 1, wherein the first threshold is a function of a locale within the social networking system.

13. The process of claim 1, comprising blacklisting a particular personal attribute.

14. A tangible computer storage device comprising instructions that when executed by a processor execute a process comprising:
receiving into a computer processor data extracted from profiles on a social networking system, the data relating to a personal attribute;
writing data to a database when a first personal attribute exceeds a first threshold;
generating a plurality of pairings, each of the plurality of pairings comprising the first personal attribute and one of a plurality of other similar personal attributes;
for at least one pairing of the plurality of pairings:
  determining a degree of similarity between the first personal attribute and the other similar personal attribute in the at least one pairing;
  in response to the degree of similarity between the first personal attribute and the other similar personal attribute exceeding a second threshold, providing a plurality of users an opportunity to provide input regarding the degree of similarity of the at least one pairing;
  receiving into the computer processor input from the plurality of users, the input indicating an agreement or disagreement by each of the users regarding the degree of similarity of the at least one pairing; and
  writing the at least one pairing based on the input from the plurality of users;
wherein the input from the plurality of users relating to the agreement or disagreement regarding the degree of similarity between the first personal attribute and the other similar personal attribute in each of the plurality of pairings comprises a two-step voting process, the two-step voting process comprising a vote on each of the one or more pairings and a selection of one of the one or more pairings as a label for the first personal attribute; and
wherein the determination of the degree of similarity between the first personal attribute and the other similar personal attribute is based on all of the following:
  a distribution over a plurality of industries of the first personal attribute and the other similar personal attribute;
  a co-occurrence within a profile in the social networking service of the first personal attribute and the other similar personal attribute;
  a skill within a profile of a connection within the social networking system;
  a difference in characters and positions of characters of the first personal attribute and the other similar personal attribute;
  a ratio of a number of profiles including the first personal attribute and a number of profiles including the other similar personal attribute; and
  a first webpage containing the first personal attribute and a second webpage containing the other similar personal attribute, wherein the first webpage is linked to the second webpage.

15. A process comprising:
receiving into a computer processor data extracted from profiles on a social networking system;
writing the data to a database when the data exceeds a first threshold;
determining a degree of similarity between the data and other similar data;
writing the data and a first portion of the other similar data to the database when the degree of similarity between the data and the first portion of the other similar data exceeds a second threshold;
receiving into the computer processor input from a plurality of users, the input relating to an agreement or disagreement by each of the users regarding the degree of similarity between the data and the first portion of the other similar data;
writing the data and a second portion of the other similar data to the database as a function of the agreement or disagreement of the plurality of users;
determining that there is no other similar data for pairing with the data;
presenting the data to the plurality of users;
receiving input from the plurality of users, the input comprising one or more suggested similar other data for association with the data;
forming a pairing of the data and a particular suggested other similar data; and
writing the pairing of the data and the particular suggested similar other data to the database as a function of the input from the plurality of users;
wherein the determination of the degree of similarity between the data and other similar data is based on all of the following:
  a distribution over a plurality of industries of the data and other similar data;
  a co-occurrence within a profile in the social networking service of the data and other similar data;
  a skill within a profile of a connection within the social networking system;
  a difference in characters and positions of characters of the data and other similar data;
  a ratio of a number of profiles including the data and a number of profiles including the other similar data; and
  a first webpage containing the data and a second webpage containing the other similar data, wherein the first webpage is linked to the second webpage; and
wherein the determination of the degree of similarity between the data and other similar data is a function of a difference in characters and positions of characters of the data and other similar data.

* * * * *

UNITED STATES PATENT AND TRADEMARK OFFICE
CERTIFICATE OF CORRECTION

PATENT NO. : 10,140,340 B2
APPLICATION NO. : 14/595378
DATED : November 27, 2018
INVENTOR(S) : Monsch et al.

It is certified that error appears in the above-identified patent and that said Letters Patent is hereby corrected as shown below:

In the Claims

In Column 23, Line 47, in Claim 14, after "pairing", insert --to the database--

Signed and Sealed this
Twenty-eighth Day of April, 2020

Andrei Iancu
*Director of the United States Patent and Trademark Office*